(No Model.)

J. W. FARRELL.
SOLDERING POT.

No. 259,635. Patented June 13, 1882.

WITNESSES:
A. P. Grant,
W. F. Kircher

INVENTOR:
James W. Farrell,
BY John A. Biedersheim
ATTORNEY.

N. PETERS, Photo-Lithographer, Washington, D. C.

UNITED STATES PATENT OFFICE.

JAMES W. FARRELL, OF PHILADELPHIA, ASSIGNOR OF ONE-HALF TO FRANK W. EDWARDS, OF THURLOW, PENNSYLVANIA.

SOLDERING-POT.

SPECIFICATION forming part of Letters Patent No. 259,635, dated June 13, 1882.

Application filed April 28, 1882. (No model.)

*To all whom it may concern:*

Be it known that I, JAMES W. FARRELL, a citizen of the United States, residing in the city and county of Philadelphia, State of Pennsylvania, have invented a new and useful Improvement in Soldering-Pots, which improvement is fully set forth in the following specification and accompanying drawings, in which—

Figure 1:
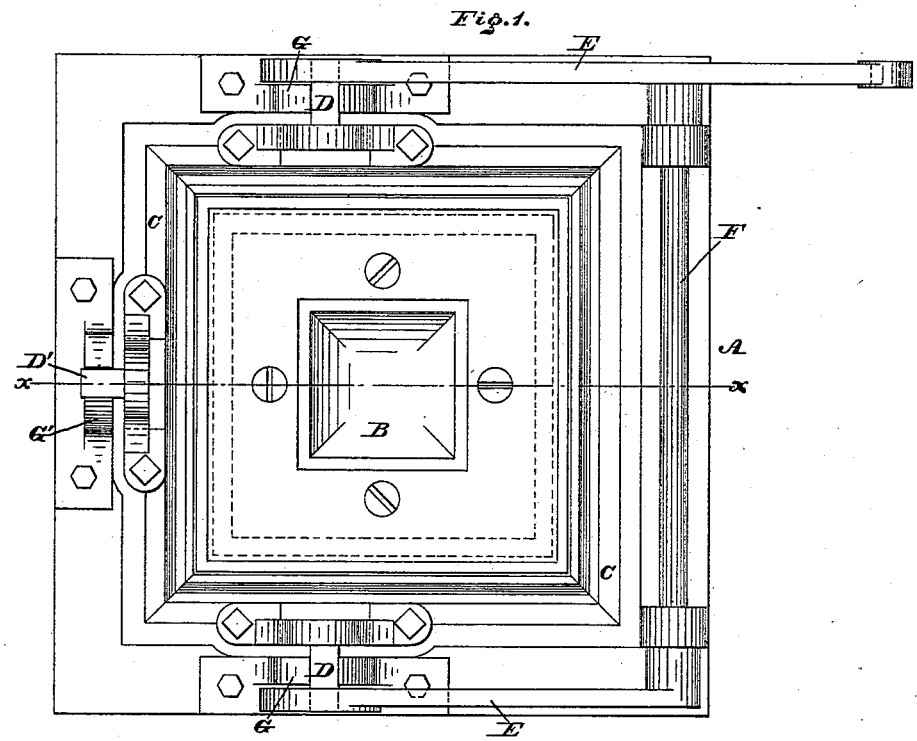
Figure 2:
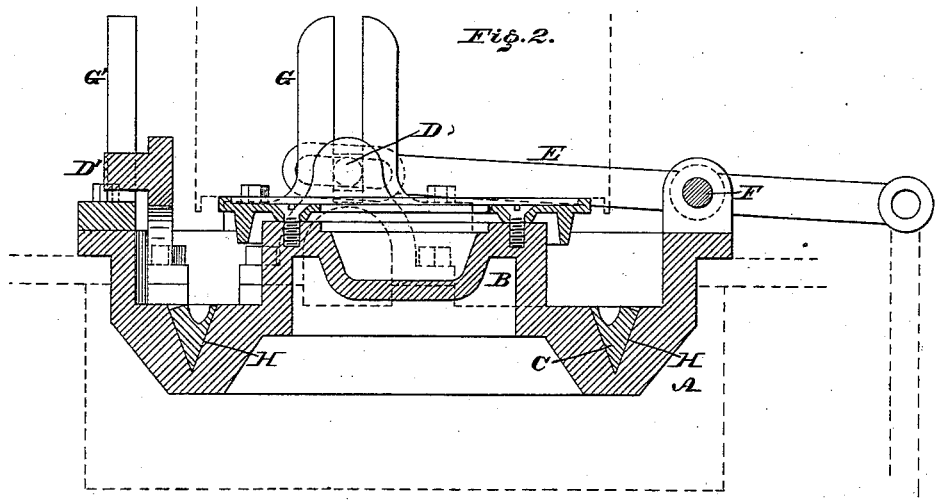

Figure 1 is a top or plan view of the soldering-pot embodying my invention. Fig. 2 is a vertical section thereof in line $x$ $x$, Fig. 1.

Similar letters of reference indicate corresponding parts in the two figures.

My invention relates to soldering-pots having troughs for dipping up the solder from the lower parts of said pot and applying it to the cans or other articles to be soldered; and it consists in the peculiar construction of the trough and pot, and of the construction of the trough-guides and operating mechanism, combined and operating substantially as hereinafter set forth.

Referring to the drawings, A represents a soldering-pot, which is heated by suitable means, and B represents a bed rising from the center of the pot for supporting the can or other article to be soldered.

C represents a rising and falling trough, which is fitted within the pot in the space around the bed B, the shape of said trough in the present case being four-sided to accord with the shape of the bed B, and consequently of the article to be soldered, said article being hereinafter described as a can.

To opposite sides of the trough are attached laterally-projecting journals D, to which are fitted arms E, the latter being slotted longitudinally to receive the said gudgeons, the ends of which opposite to the journals are fixed to a shaft, F, whose bearings are on the pot A, said shaft F being rotated by a treadle, hand-wheel, or other suitable means.

In order to cause the trough C to move true, the journals are fitted in guides G, which are secured to and rise from the pot A, and a gudgeon, D', is secured to the trough at the side opposite to the shaft F, said gudgeon playing in a guide, G', which is secured to and rises from the pot A. If desired, a gudgeon and guide similar to the gudgeon D and guide G may be provided on the side adjacent to the shaft F, whereby every side of the trough is guided.

The operation is as follows: The pot A is supplied with solder and heated, and the can placed on the bed B, the edges of the can overhanging the trough or tray C. The shaft F is then rotated, whereby the arms E raise the trough and cause the solder in the latter to be conveyed to the edges of the can.

It will be seen that as the trough rises it carries with it the quantity of solder that occupies the channel of said trough and emerges through and above the dross or scum, whereby the latter is not raised and presented to the can, and thus only pure solder is used as applied to the can, the application of the solder to the can being uniform throughout. The trough is then lowered and the can inverted and reapplied, or another can placed on the bed B. The trough again dips into the solder and is filled therewith, and then raised, thus repeating the soldering operation.

In order to cause the trough to be filled at all times with solder, the bottom of the pot is formed with a groove, H, which is adapted to receive the trough, the shape of the groove and under side of the trough being tapering, so that when the trough is lowered it enters the groove, displaces the solder, and locates the channel of the trough below the base of the space or chamber which contains the solder, so that the solder readily flows into the trough.

The weight of the trough and that of the journals and gudgeon is sufficient to lower the trough; but, if desired, the arms E may be employed to assist in unfailingly forcing down the trough to its proper position at the bottom of the pot; or springs suitably applied may accomplish the same object.

Having thus described my invention, what I claim as new, and desire to secure by Letters Patent, is—

1. The bed B, in combination with vertically-movable trough C, depressed below said bed and surrounding it, and provided with gudgeons D, the shaft F, the longitudinally-slotted arms E, and the vertically-slotted guides G, the said gudgeons sitting in the slots of said arms and said guides, substantially as set forth.

2. Slotted guides G and G', in combination with a vertically-movable trough having lugs which fit in the former guides and gudgeons which fit in the latter guides, the bed B, which supports the cans, the shaft F, and slotted arms E, substantially as set forth.

3. The trough, in combination with the pot formed with a groove in its bottom of a shape corresponding to the contour of said trough, in order that it may receive said trough when the latter is lowered, substantially as set forth.

4. The trough, in combination with the pot having a groove in its bottom, said groove being adapted to receive said trough, substantially as set forth.

J. W. FARRELL.

Witnesses:
JOHN A. WIEDERSHEIM,
A. P. GRANT.